United States Patent [19]

Smock et al.

[11] 4,024,304

[45] May 17, 1977

[54] METHOD OF FINISHING THE SURFACE OF A POROUS BODY

[75] Inventors: George E. Smock, Heath; Gregory C. Brock, Jr., Granville; Homer G. Hill, Newark; Kenneth L. Austin, Granville, all of Ohio

[73] Assignee: Owens-Corning Fiberglas Corporation, Toledo, Ohio

[22] Filed: Mar. 24, 1975

[21] Appl. No.: 561,565

[52] U.S. Cl. .............................. 427/316; 427/331; 427/385 A; 427/430 B; 427/390 A; 428/431; 428/331; 428/306; 428/320; 264/109; 264/131

[51] Int. Cl.² ..................... B32B 7/10; B32B 19/06

[58] Field of Search .......... 427/314, 316, 358, 359, 427/390 R, 407 B; 428/430, 431, 290, 324, 273, 306, 255, 305, 320, 321, 322; 264/118, 122, 128

[56] References Cited

UNITED STATES PATENTS

| | | | |
|---|---|---|---|
| 2,725,271 | 11/1955 | Cunningham | 427/430 R |
| 3,389,008 | 6/1968 | Bailey | 427/316 |

*Primary Examiner*—Ralph S. Kendall

*Attorney, Agent, or Firm*—John W. Overman; Allen D. Gutchess; Philip R. Cloutier

[57] ABSTRACT

A porous article with a special finish treatment is provided, the article typically being an article of furniture, such as a cabinet door, by way of illustration. The article can be made of a molding compound comprising discrete glass fibers which can be produced by milling cured phenolic-bonded glass fibers. A coupling agent or binder is added to the milled fibers and the combination formed and cured under heat and pressure into the shape of the article. The surface of the formed article is porous and, in fact, the article is porous throughout its thickness. This presents a substantial problem in applying a satisfactory finish. To overcome this, with the article at an elevated temperature, it is immersed in a liquid containing particles in suspension, i.e. polyester liquid containing talc. Because the article is at an elevated temperature, there is less air within the interstices or pores thereof and when the article is in the sealing liquid at a substantially lower temperature, penetration effectively occurs to provide a smooth, substantially non-porous surface which is ready to receive a finish coating. The talc particles fill pores in the surface of the article and limit the extent of penetration of the liquid.

3 Claims, 4 Drawing Figures

METHOD OF FINISHING THE SURFACE OF A POROUS BODY

This invention relates to a method of finishing the surface of a porous article and to a product produced thereby.

The invention can be advantageously utilized with a variety of porous articles having porous surfaces in which pores or cavities extend at least a substantial distance below the surfaces. Examples of such open pore articles include cement blocks, chipboard, open-celled foam materials, asbestos products, and some wood fiber products. An article embodying the invention also can be made from a molding compound which can be in the form of glass fibers held together by a resin binder. The fibers are subjected to a milling process to subdivide them into short, discrete lengths having a length-to-diameter ratio in a range of approximately 10 to 100. The resulting short, particulate fibers, at least many still having a binder coating thereon, are mixed with uncured binder particles and then subjected to heat and pressure to cure the binder and to form the desired article having an unfinished surface.

The unfinished article has a porous surface due to the nature of the molding compound and, in fact, is porous throughout its thickness. In addition, the porosity is not necessarily uniform over the entire surface. Consequently, the article is difficult to finish, particularly when the appearance is of considerable importance, as when the article is an article of furniture, such as a cabinet door.

Numerous attempts have been made to close or seal the pores or interstices of the article prior to applying the finish coating. Heretofore, all of the sealing liquids tried and techniques employed have been unsatisfactory because of such factors as improper penetration of the sealing liquid, inability to fill the pores, an excess amount being required, high costs, flammability problems, lack of dimensional stability due to moisture absorption and swelling, a high degree of saturability, and lack of impact resistance.

In accordance with the invention, a sealing liquid has been discovered which overcomes the deficiencies heretofore encountered and a technique for applying this sealing liquid and for obtaining the desired penetration thereof has also been developed. The article to be sealed is heated to an elevated temperature, e.g. 200°–400° F., and a sealing liquid applied at that time, preferably by immersion of the article, the sealing liquid preferably being at a temperature substantially below that of the article. The sealing liquid is a plastic material and has particles in suspension. The particles preferably have maximum dimensions smaller than the minimum dimensions of a majority of the pores or cavities so that they can enter the pores and seal them. If the particles were larger than the pores, they would tend to sit on the surface of the article and hide or obscure the detail thereof. By way of a specific example, the sealing liquid includes a polyester in which is suspended particles of talc.

With the porous article being at an elevated temperature, less air is in the pores than if the article were at room temperature. Consequently, when the article is contacted by the relatively cool sealing liquid, the air accordingly contracts and tends to pull the sealing liquid and particles into the surface pores. The article can be separated from the sealing liquid before penetration is complete. Penetration will then continue after separation to pull the liquid into the surface further and prevent a resin-rich surface. The talc particles are instrumental in filling the pores without penetrating below the surface excessively and they also reduce the amount of polyester required, to correspondingly reduce costs. When the sealing liquid is cured or hardened, the article can then be finished, usually by the application of a single finish coat, with the surface being sufficiently smooth that additional finish coats are not required.

It is, therefore, a principal object of the invention to provide an improved, more attractive article made of a porous material.

Another object of the invention is to provide an improved method of sealing the porous surface of an article.

A further object of the invention is to provide an article having a porous surface filled with a resin and a particulate filler material.

Many other objects and advantages of the invention will be apparent from the following detailed description of preferred embodiments thereof, reference being made to the accompanying drawings, in which.

A molding compound from which an article embodying the invention can be made basically comprises short, discrete glass fibers which can be obtained from glass fibers bound in a matrix of an unreactive binder, such as a phenolic resin binder. These can be hammermilled to produce the short fibers of discrete lengths with binder thereon. While the hammermilled fibers give somewhat of an appearance of being sand, they actually are in fibrous form with the lengths being from ten to 100 times the diameters, with the average diameter being about 0.00040 inch, for example. Binder exists on the fibers in an amount of about 10 percent, by weight, on the average. An additional coupling agent or binder such as a phenolic resole can be added, with the fibers being soaked in a solution of such and drained. The fibers can also be mixed with phenolic resin powder. Suitable additives such as zinc stearate can be employed to adjust the desired consistency to aid in release of the product from the mold. Molding compounds of this nature are disclosed and discussed more fully in a co-pending U.S. patent application of Smock et al., entitled "Composition of Matter and Method of its Preparation", filed on Oct. 23, 1973 and bearing Ser. No. 408,704, now abandoned.

Figure 1:
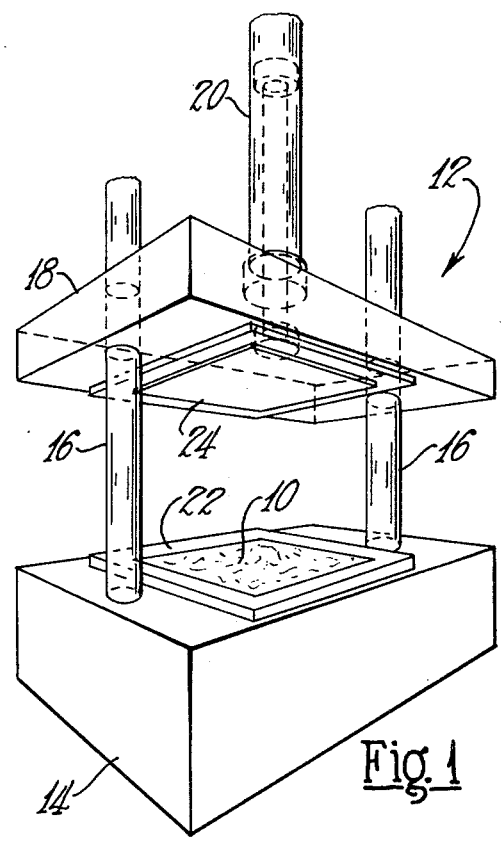
FIG. 1 is a schematic view in perspective of apparatus for shaping, as by molding, an article in accordance with the invention.
Figure 2:
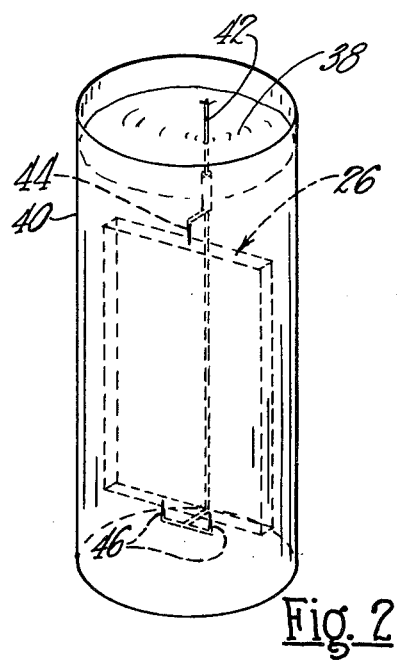
FIG. 2 is a schematic view in perspective of a receptacle in which a molded article is immersed to receive into the surface pores of a sealing liquid in the receptacle.
Figure 3:
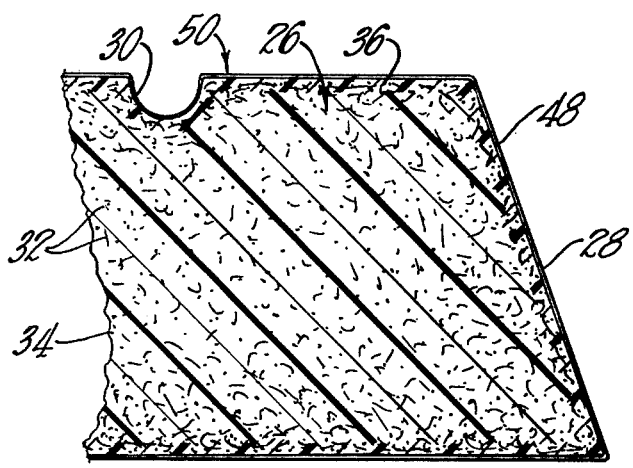
FIG. 3 is an enlarged, schematic view of a portion of an article molded with the apparatus of FIG. 1 and sealed with the sealing liquid of the apparatus of FIG. 2.

A prepared molding compound indicated at 10 in FIG. 1 is placed in a molding apparatus or press 12 for producing a cabinet door, by way of illustration. The apparatus 12 includes a base 14 with upwardly-extending columns or ways 16 on which a molding head 18 is slidably mounted. The head 18 is moved vertically by a fluid-operated actuator 20 of any suitable design, this being supported from above by means not shown. A lower mold half or die section 22 is supported on the base 14 and a matched upper mold half or die section 24 is affixed to the lower surface of the head 18. Dowel pins or other suitable means can be emloyed to place the mold halves 22 and 24 in accurate registry when the head 18 is moved downwardly by the actuator 20, as is well known in the art.

With the molding compound 10 having a phenolic binder resin in an amount of 10–50% by weight and preferably about 15–20% by weight, the mold halves are heated to a temperature of 500° F. for a period of 45 seconds to effect curing or polymerization of this thermosetting binder. While the mold halves are brought together under substantial pressure, the pressure actually exerted on the molding compound 10 is only in the order of 10 psi., with the molding compound compressed to about one-fourth its original thickness. Temperatures of 300° F. or lower up to 700° F. can be employed to provide the proper curing, the higher temperatures reducing the curing time. A resulting unfinished door taken from the apparatus 12 is indicated at 26 and can be of any suitable design, the door, as shown, having a beveled edge 28 and a groove 30 extending in a rectangular pattern, spaced from and parallel to the four beveled edges 28. The compound 10 is compacted more in the groove 30 so that the surface of the article has a varying density.

Short, discrete fibers 32 bonded together by a cured binder 34 make up the door which typically is ⅝ inch thick and has a density from 30 to as much as 100 pcf, but preferably about 30–35 pcf. The unfinished door is strong, impact resistant, dimensionally stable and warp-proof, and has excellent surface detail. The unfinished door, however, has a porous surface and, in fact, is porous throughout; the surface density also varies. This presents a difficult finishing step, especially where a smooth, flawless finish is required, as for furniture.

To overcome the above problem, a sealing layer 36 of hardened material is formed on the unfinished door 26. To achieve the layer 36, the door 26 is immersed in a sealing liquid 38 located in a suitable container 40. To suspend and manipulate the door 26, a hanger 42 is provided, the hanger including a single upper prong 44 and two lower prongs 46 for engaging the upper and lower edges of the door and enabling it to be manipulated, turned, etc. more readily than if only a single prong were used at each of the edges.

The door 26 is immersed when at an elevated temperature with the liquid 38 preferably being at room temperature. A temperature differential in the order of 200° F. or more is desired with the liquid being at a temperature of 200° F. to 400° F. Higher temperatures have a tendency to boil off or carbonize the resin. The door can be immersed in the sealing liquid immediately after it is taken from the molding apparatus 12 so that a reheating step is not necessary. The elevated temperature of the door results in a lesser amount of air therein. When the door is immersed in the relatively cool sealing liquid, the remaining air in the door contracts as it cools and inherently pulls through the surface of the door the sealing liquid 38 to form the layer 36. At this time, the suspended particles in the liquid tend to be filtered out as penetration proceeds. The particles thereby close off the pores or cavities in and near the surface to act as valves and limit further penetration of the liquid. More uniform penetration of the liquid also is achieved over the surface of the door, even though the density varies rather widely over the surface, particularly when the pattern of the surface is compressed to different degrees to produce a molded surface design on the article.

Rather than applying the sealing liquid by immersion, the unfinished door can be passed through a fog chamber containing a liqud vapor or this liquid can be applied by a roller applicator, a spray, or a curtain coater, by way of example. A vacuum can also be applied to one side of the door and the liquid applied to the opposite so that the vacuum will aid in pulling the liquid through the surface. In such an instance, the door need not be heated, although even then the heat can help reduce the viscosity of the sealing liquid to improve the penetration thereof.

The sealing layer typically penetrates about one-sixteenth inch on the average. The layer 36 preferably is fire retardant, abuse resistant, and seals the surface fully so that a finish coating 48 can be applied to the surface preferably in a single coat to form a final finished door 50.

A highly effective sealing liquid includes polyesters present in an amount of 62%, styrene in an amount of 25%, talc in an amount of 11%, and TBPB (Tert-Butyperbenzoate) in an amount of 1%, by weight. More specifically, the sealing liquid was made according to the following formulation:

| Ingredient | Parts per 100 | Example |
|---|---|---|
| E-650 Polyester | 31.230 | 1000 g |
| Hetron 24609 Polyester | 31.230 | 1000 g |
| Styrene | 24.984 | 800 g |
| French Talc | 11.243 | 360 g |
| TBPB | 1.312 | 42 g |

The E-650 polyester is commercially available from Owens-Corning Fiberglas Corp. The Hetron polyester is commercially available from the Durez division of Hooker Chemical Company and provides flame resistance for the surface. The styrene reduced the viscosity of the sealing liquid for controlled penetration. The French talc is available from L. A. Solomon Company. The TBPB is a catalyst.

The unfinished door was immersed in the liquid at a temperature of 300° F. until completely covered and was then removed and drained. The door was then cured at 300° F. for 45 minutes. Of course, with a solvent system, heating to achieve curing is not necessary. The resulting door had a penetration of the sealer of about one-sixteenth inch and the sealing liquid constituted about 20 percent of the final door weight.

Figure 4:
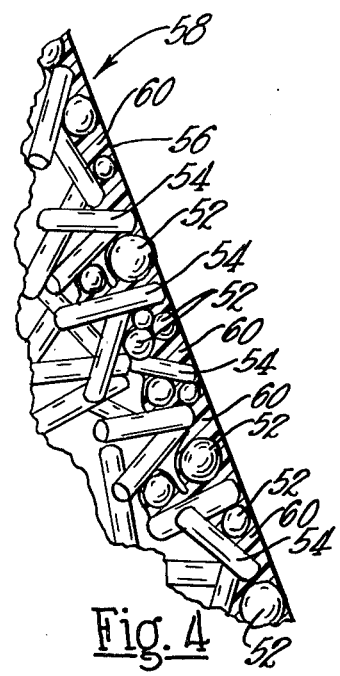
FIG. 4 is an even further enlarged, somewhat schematic view in section of a surface portion of an article sealed in accordance with the invention.

Other plastic materials are suitable for the sealing liquid, including epoxies, polypropylene, nylons, "Derakane", available from the Dow Chemical Company, polyvinyl acetate, and even some phenolics under certain conditions. The talc is important in enabling the sealing liquid to seal the pores of the door more uniformly, without requiring an excessive amount, and without an excessive penetration which would otherwise only add weight and cost to the door without contributing to its favorable characteristics. The talc is in particulate form, having a U.S. Standard Sieve size of 200 mesh or smaller. In addition to talc, other particulate materials which can be employed include alumina, Kaolin clays, diatomaceous earths, calcium carbonate, pulverized glass, and "Cab-o-sil", commercially available from Cabot Corporation. The size of the particulate material is important since the maximum dimension across the larger particles should not exceed the minimum dimensions across the pores or cavities of the surface of the article. Otherwise, the particles will tend to sit on the surface and obscure the detail of the pattern or design. As shown in FIG. 4, various particles indicated at 52 are in pores or cavities 54 near a surface 56 of an article 58 which has been treated with the sealing liquid indicated at 60 in its cured form. The particles 52 tend to become trapped or wedged in the pores 54 and seal them off, thereby preventing or at least restricting further penetration of the liquid.

The article is preferably removed from the liquid before maximum pentration is achieved, which is a function of time, with the degree of penetration slowing down as time increases. By removing the door before penetration is complete, the resin will be pulled further into the surface upon removal to prevent the possibility of a resin-rich surface developing. Such a surface tends to blister as the monomer tends to come out during curing. Also, with the resin-rich surface, air within the door might become trapped and tend to bubble out during curing. It is also possible to dip the edges of the door first before dipping the entire door, so that greater penetration will be achieved at the edges where impact resistance, in particular, is desirable.

Iron oxide as a filler can also be used to provide a magnetic quality for the product or graphite can be used to form a blackboard for chalk.

Other articles or products which can be made and finished in accordance with the invention include electrical outlet covers, wall plaques, toilet seats, wall paneling, counter tops, pool table tops, and window sills.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. A method of producing a surface design in a porous body comprising: molding a porous plastic body at a temperature between approximately 300° and 700° F against a surface containing a desired surface design to produce a porous body having a porous surface of the desired finished configuration but which is too porous to paint, the body having a density from 30 to 100 pounds per cubic foot and molded from a molding compound of hammermilled glass fibers and a thermosetting phenolic binder, preparing a dispersion of inert particles in a heat-thinnable, organic binder-forming material, the particles being of a size to become wedged in the pores of the finished configured surface, contacting the finished configured surface with the dispersion by immersing the molded body in the dispersion while the molded body still has heat from the molding operation, draining excess dispersion from the surface, and controlling the time of contact so that the penetration is at such a state that the pores of the surface are essentially filled while any undrained excess on the surface continues to penetrate the surface to a degree where the remaining dispersion does not change the desired configuration of the surface.

2. The method of claim 1 wherein said immersing step is carried out with a thermosetting resin dispersion of minus 200 mesh talc in a solvent thinned solution of a thermosetting resin prepolymer.

3. The method of claim 2 wherein said dispersion comprises minus 200 mesh talc in a styrene solution of a polyester prepolymer.

* * * * *